United States Patent [19]
Hungerford, Jr.

[11] Patent Number: 5,794,896
[45] Date of Patent: Aug. 18, 1998

[54] PIPE CLAMP

[76] Inventor: Charles S. Hungerford, Jr., 153 East Ave., New Canaan, Conn. 06840

[21] Appl. No.: 542,260

[22] Filed: Nov. 15, 1995

Related U.S. Application Data

[63] Continuation-in-part of Ser. No. 229,670, Apr. 19, 1994, Pat. No. 5,478,033.

[51] Int. Cl.[6] .................................................. F16L 3/08
[52] U.S. Cl. ........................................................ 248/74.3
[58] Field of Search ............................. 248/74.3, 74.2, 248/74.1, 73, 65, 67.7, 67.5, 316.1, 316.5; 24/20 R, 20 EE, 20 S; 403/397

[56] References Cited

U.S. PATENT DOCUMENTS

| | | | |
|---|---|---|---|
| 4,291,855 | 9/1981 | Schenkel et al. | 24/339 X |
| 4,728,071 | 3/1988 | Salacuse | 248/316.5 |
| 5,533,696 | 7/1996 | Laughlin et al. | 248/74.1 |

*Primary Examiner*—Ramon O. Ramirez
*Attorney, Agent, or Firm*—Bachman & LaPointe, P.C.

[57] ABSTRACT

A pipe clamp for supporting a pipe, comprising a base; a pair of support element sections extending from the base; a pair of clamp members; deflection means interconnecting the pair of support element sections and the pair of clamp members; tab means on each of the pair of support element sections projecting toward each of the deflection means for supporting the deflection means.

3 Claims, 1 Drawing Sheet

PIPE CLAMP

CROSS REFERENCE TO RELATED APPLICATIONS

This application is a Continuation-In-Part of application Ser. No. 08/229,670 for PIPE CLAMP, By Charles S. Hungerford, Jr. filed Apr. 19, 1994), now Pat. No. 5,478,033.

BACKGROUND OF THE INVENTION

The present invention is directed toward devices for supporting piping, and more particularly to a pipe clamp having a design for easy and economical manufacture which is formed from a unitary and continuous sheet of material.

In the plumbing industry or the like which includes the use of pipes for carrying various fluids such as water, oil, gas and the like, a substantial problem exists in supporting the pipe lines. For example, pipes may run through sewers or the like and the pipes need to be supported on the sewer walls. Difficulties arise in hanging pipe and securing the same because the pipe can be heavy and difficult to hold while trying to attach it to a bracket or clamp or the like on a wall. Accordingly, the piping art includes a variety of piping supports and clamps which can be used for applications requiring easy to use, fast connecting supports. However, as discussed below the pipe clamp or supports available on the market today are expensive due to the somewhat complex molds used for manufacturing the same.

U.S. Pat. No. 5,118,215 to Freier discloses a pipe clip wherein the pipe clip comprises a baseplate and a pair of arcuate-shaped strap segments having struts pivotally attached thereto for attaching the same to the baseplate. The strap segments include mutually engagable toothed closure tongues on the outer end portions of the same so as to lock the straps in place around the pipe, when in use. When the closure tongues are engaged around the pipe, the straps are symmetrical. As can be seen from the figures, the pipe clip shown in the Freier patent is substantially complex in design. The clip shown therein is preferably formed via a molding process and thus requires a substantially complex mold to be engineered for manufacturing the same. The price for engineering the mold is passed on to the price of the clip and consequently, the clip shown in Freier is reflectively expensive. The clip in Freier could not be manufactured from a unitary sheet of continuous metal or other material due to the non-continuous nature of the design. Accordingly, unlike the instant invention, the pipe clip shown in Freier lacks the ability to be inexpensive to manufacture while meeting fire codes which require metal clips.

U.S. Pat. No. 4,291,855 to Schenkel et al. discloses a pipe clamp. The pipe clamp comprises two clamp segments mounted to an attachment component. The segments can be detachably connected with one another when in their closed position about a pipe. The clamp segments are attached, toward the center of the clamp, to the attachment component by means of respective hinges located between the component and the clamp segments. The clamp segments also include cooperating locking parts for releasably connecting the clamp segments to one another about a pipe. As with the Freier clip, the design showed in Schenkel et al. is also complex and would require a complex mold for manufacturing the same. Thus, the expense of the complex mold is necessarily passed on to the consumer in the price of the pipe clamp, unlike the instant invention. Also unlike the instant invention, it is unlikely that the Schenkel et al. pipe clamp could be manufactured from a sheet of metal. The design is too complex and non-continuous for the formation of the clamp via a continuous sheet of material. While the specification in Schenkel et al. does allude to the possibility of forming the pipe clamp from metal, it is unlikely that the preferred embodiment could be manufactured from a sheet of continuous metal, for obtaining the obvious cost reducing advantages, i.e., decreased manufacturing steps.

Hence, there exists a need in the plumbing and piping arts for a pipe clamp or support which can be efficiently and economically manufactured, which is inexpensive to purchase and which is acceptable for various fire codes.

SUMMARY OF THE INVENTION

The primary object of this invention is to provide a pipe clamp or support which is economical to manufacture and consequently, economical to purchase.

Another object of this invention is to provide a pipe clamp or support which can be economically manufactured from metal so as to meet the requirements of various fire codes.

Still another object of this invention is to provide a pipe clamp or support which can be easily installed under various applications and which provides excellent support and security to piping.

The foregoing objects are attained by the inventive pipe clamp of the present invention which comprises a pipe clamp for supporting a pipe, comprising a base; a pair of support element sections extending from the base; a pair of clamp members; deflection means interconnecting the pair of support element sections and the pair of clamp members; tab means on each of the pair of support element sections projecting toward each of the deflection means for supporting the deflection means.

The details of the present invention are set out in the following description and drawings wherein like reference characters depict like elements.

DETAILED DESCRIPTION

Figure 1:
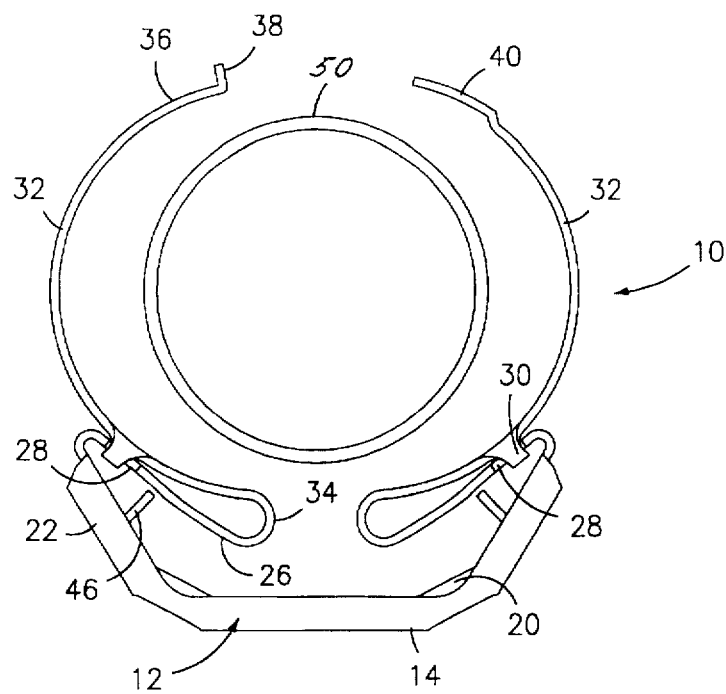
FIG. 1 is a front elevational view of the pipe clamp in accordance with the principles of the present invention showing a pipe being placed into the pipe clamp.
Figure 2:
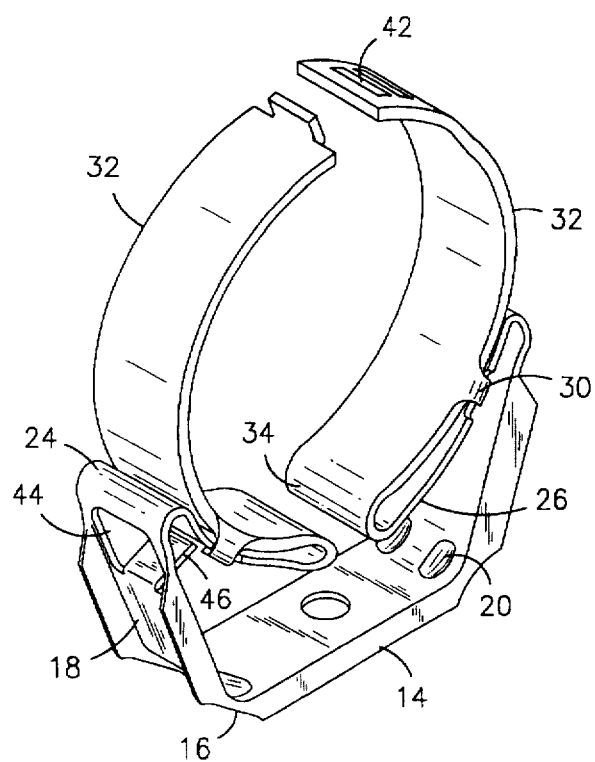
FIG. 2 is a perspective view of the pipe clamp in accordance with the principles of the present invention.

Referring to FIGS. 1 and 2, clamp 10 comprising base section 12 includes substantially perpendicularly extending support flanges 14. Flanges 14 extend away from the pipe clamping area on both longitudinal edges of base section 12 and provide additional support against outwardly directed bending forces.

Bends 16 between base sections 12 and support element sections 18 include corner traversing inside indents 20. Indents 20 provide further support against the inward bending of clamp 10 upon installations of a pipe. Indents 20 traverse bends 16 as discussed above for assisting in preventing support element sections 18 from flexing during the opening and closing of pipe clamp 10 for the installation of pipe.

Support element sections 18 has substantially perpendicularly extending flanges 22 protruding outwardly relative the pipe clamping area, on each longitudinal edge thereof, similar to base section 12. Flanges 22 also provide further support against bending forces during pipe installation outwardly directed.

Radial bends 24 join support element sections 18 to the deflection members 26. Deflection members 26 also includes a relief portions 28 which extends for about one third the length of deflection member sections 26 and are also preferably positioned adjacent radial bends 24. Relief portions 28 are primarily for engaging locking wings 30 which extend from clamp members 32. Relief portions 28 may also provide some additional flexibility to deflection member sections 26 during pipe installation.

Clamp member sections 32 are immediately segregated from deflection member sections 26 via radial bends 34. Sufficient flexibility of clamp member sections 32 to deflect is partially acquired through its immediate vicinity to deflection member sections 26. Clamp member sections 32 gains additional flexibility from its substantial upwardly extending free end. Clamp member sections 32 include locking wings 30 extending outwardly therefrom, transverse to its longitudinal dimension. Locking wings 30 are positioned on clamp member sections 32 at a location from which they engage relief portions 28 of deflection member sections 26, adjacent radial edge 34. Accordingly, locking wings 30 are bent about deflection member section 26 in the area of relief portions 28, securely binding clamp member sections 32 to deflection member sections 26. This connection assists in forcing clamp 10 to maintain its overall shape after repeated bending during repeated installations and removal of pipe.

Insert portion 36 includes an upwardly extending tab 38 extending substantially away from the pipe clamp area and perpendicularly from the end of one clamp member section 32. The other clamp member section 32 includes an engagement portion 40 which comprises a stepped up portion of the other clamp member section 32 and preferably includes a series of parallel spaced slots 42. Slots 42 start from the upper end of the other clamp member section 32 and extend down the longitudinal center thereof. Slots 42 are meant to engage tab 38 upon the installation of a pipe into pipe clamp 10, as shown in FIG. 1, at various degrees of tightness. Slots 42 lock over tab 38 so as to securely hold the pipe therein. The stepped up design allows for an easier connection between tab 38 and one of slots 42.

In accordance with the improvement of the present invention, support element sections 18 are provided with relief openings 44 below the radial bends 24 in order to increase clamp flexibility. Tabs 46 are bent inwardly toward and may abut deflection members 26 so as to add support for the deflection members 26 when pipe 50 is positioned in the clamp 10. The arrangement allows for flexibility and support simultaneously. In addition, and most advantageously, the tabs 46 strengthen the shear strength of clamp 10, that is, in the direction perpendicular to the longitudinal axis of the pipe 50, i.e., parallel to the length of base 12. The tabs 46 are found from the material removed from the support element sections 18 to form the relief openings 44.

With reference to FIG. 1, during installation of pipe 50, as pipe 50 is pushed downwardly upon upwardly extending radial bends 34, clamp member sections 32 are responsive, moving inwardly and enveloping pipe 50 causing tab 38 and one of slots 42 to engage and lock pipe clamp 10 around pipe 50. During this installation, flanges 14 and 22 function to maintain base section 14 and support elements sections 18 substantially rigid for maintaining the overall structural integrity of clamp 10. Tabs 46 support deflection members 26.

As pipe 50 is pushed against radial bends 34, deflection member sections 26 move downwardly and inwardly, thereby returning pipe clamp 10 to its original configuration, as shown in FIG. 2. Continued pushing of pipe 50 against radial bends 34 will cause one of slots 42 to engage tab 38 so as to lock clamp member sections 32 together around pipe 50. Accordingly, pipe 50 becomes securely installed within pipe clamp 5.

It is apparent that there has been provided in accordance with this invention a pipe clamp which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A pipe clamp for supporting a pipe, comprising:

a base;

a pair of support element sections extending from the base;

a pair of clamp members;

deflection means interconnecting said pair of support element sections and said pair of clamp members;

tab means on each of said pair of support element sections projecting toward each of said deflection means for supporting said deflection means.

2. A pipe clamp according to claim 1 wherein each of said pair of support element sections is provided with a relief opening and said tab means projects from an edge of the relief opening.

3. A pipe clamp according to claim 2 wherein said tab means comprises a portion of the support element sections removed to form said relief opening.

* * * * *